United States Patent
Senninger et al.

(10) Patent No.: US 12,098,038 B2
(45) Date of Patent: Sep. 24, 2024

(54) SYSTEMS AND METHODS FOR SORTING AND DISPENSING PACKAGES

(71) Applicant: AI International, Inc., Louisville, KY (US)

(72) Inventors: John Senninger, Prospect, KY (US); Christopher Phillips, Crestwood, KY (US)

(73) Assignee: AI INTERNATIONAL, INC., Louisville, KY (US)

( * ) Notice: Subject to any disclaimer, the term of this patent is extended or adjusted under 35 U.S.C. 154(b) by 133 days.

(21) Appl. No.: 17/837,650

(22) Filed: Jun. 10, 2022

(65) Prior Publication Data

US 2022/0396439 A1     Dec. 15, 2022

Related U.S. Application Data

(60) Provisional application No. 63/209,641, filed on Jun. 11, 2021.

(51) Int. Cl.
*B65G 47/96* (2006.01)
*B65G 47/04* (2006.01)

(52) U.S. Cl.
CPC .......... *B65G 47/967* (2013.01); *B65G 47/04* (2013.01); *B65G 2201/0285* (2013.01); *B65G 2811/0647* (2013.01)

(58) Field of Classification Search
None
See application file for complete search history.

(56) References Cited

U.S. PATENT DOCUMENTS

| | | | | |
|---|---|---|---|---|
| 3,136,401 | A * | 6/1964 | Fisher | B65G 11/203 74/89.21 |
| 5,220,986 | A * | 6/1993 | Winkler, III | B65G 11/203 193/38 |
| 6,015,039 | A * | 1/2000 | Bonnet | B65G 47/78 198/370.09 |
| 9,592,983 | B2 * | 3/2017 | Costanzo | B07C 3/00 |
| 10,226,794 | B2 * | 3/2019 | Vegh | B07C 5/362 |
| 10,758,943 | B1 | 9/2020 | Carpenter | |
| 2021/0008597 | A1 | 1/2021 | Grupp et al. | |

FOREIGN PATENT DOCUMENTS

| | | | | |
|---|---|---|---|---|
| CN | 210884128 U | * | 6/2020 | |
| CN | 112551109 A | * | 3/2021 | ............ B65G 47/44 |
| EP | 0521541 A1 | * | 1/1993 | |

* cited by examiner

*Primary Examiner* — William R Harp
(74) *Attorney, Agent, or Firm* — Quarles & Brady LLP

(57) ABSTRACT

A system for sorting and dispensing packages can include a flip gate assembly. The flip gate assembly can include a base, an inclined surface, one or more support legs extending from the base to the inclined surface, an actuator attached to the base, and a flip gate pivotably attached to the inclined surface. The flip gate can be configured to be actuated by the actuator between a retracted configuration, in which a top side of the flip gate is planar with a top surface of the inclined surface, and an extended configuration, in which the top side of the flip gate is disposed at an angle with respect to the top surface of the inclined surface.

20 Claims, 11 Drawing Sheets

SYSTEMS AND METHODS FOR SORTING AND DISPENSING PACKAGES

CROSS REFERENCE TO RELATED APPLICATIONS

This application claims the benefit of and priority to U.S. Application Ser. No. 63/209,641, filed on Jun. 11, 2021, the contents of which is incorporated herein by reference in its entirety.

REFERENCE REGARDING FEDERALLY SPONSORED RESEARCH OR DEVELOPMENT

Not applicable.

SEQUENCE LISTING

Not applicable.

FIELD OF EMBODIMENTS OF THE DISCLOSURE

The present disclosure provides a system and method for sorting and dispensing packages, and more specifically, to a system including a flip gate assembly.

BACKGROUND

Systems for sorting and dispensing packages can be critical in a variety of applications and settings. In some settings, such as in material handling facilities, systems for sorting and dispensing packages are utilized to sort, track, and control flow of packages through one or more processing stations of the facility. Particularly in high volume material handling facilities, it can be advantageous to utilize systems providing expeditious, yet accurate, sorting and dispensing of packages, while occupying minimal space on the material handling facility floor.

SUMMARY

In one aspect of the disclosure, a system for sorting and dispensing packages includes a flip gate assembly. The flip gate assembly can include a base, an inclined surface, one or more support legs extending from the base to the inclined surface, an actuator attached to the base, and a flip gate pivotably attached to the inclined surface. The flip gate can be configured to be actuated between a retracted configuration, in which a top side of the flip gate can be planar with a top surface of the inclined surface, and an extended configuration, in which the top side of the flip gate can be disposed at an angle with respect to the top surface of the inclined surface.

In another aspect of the disclosure, a system for sorting and dispensing packages includes a flip gate assembly. The flip gate assembly can include at least two inclined surfaces, at least two flip gates pivotably attached to the at least two inclined surfaces, respectively, and at least two actuators pivotably coupled to the at least two flip gates, respectively. The at least two flip gates can be configured to be actuated by the at least two actuators, respectively, between an extended configuration and a retracted configuration with respect to the at least two inclined surfaces.

In yet another aspect of the disclosure, a method of sorting and dispensing packages can include: (i) actuating one or more flip gates of a flip gate assembly to an extended configuration; (ii) receiving at least one package at the one or more flip gates; (iii) holding the at least one package at the one or more flip gates; (iv) actuating the one or more flip gates to a retracted configuration; and (v) dispensing the at least one package from the one or more flip gates.

Other aspects of the systems and methods for sorting and dispensing packages described herein, including features and advantages thereof, will become apparent to one of ordinary skill in the art upon examination of the figures and detailed description herein. Therefore, all such aspects of the systems and methods for sorting and dispensing packages are intended to be included in the detailed description and this summary.

DETAILED DESCRIPTION

Figure 1:
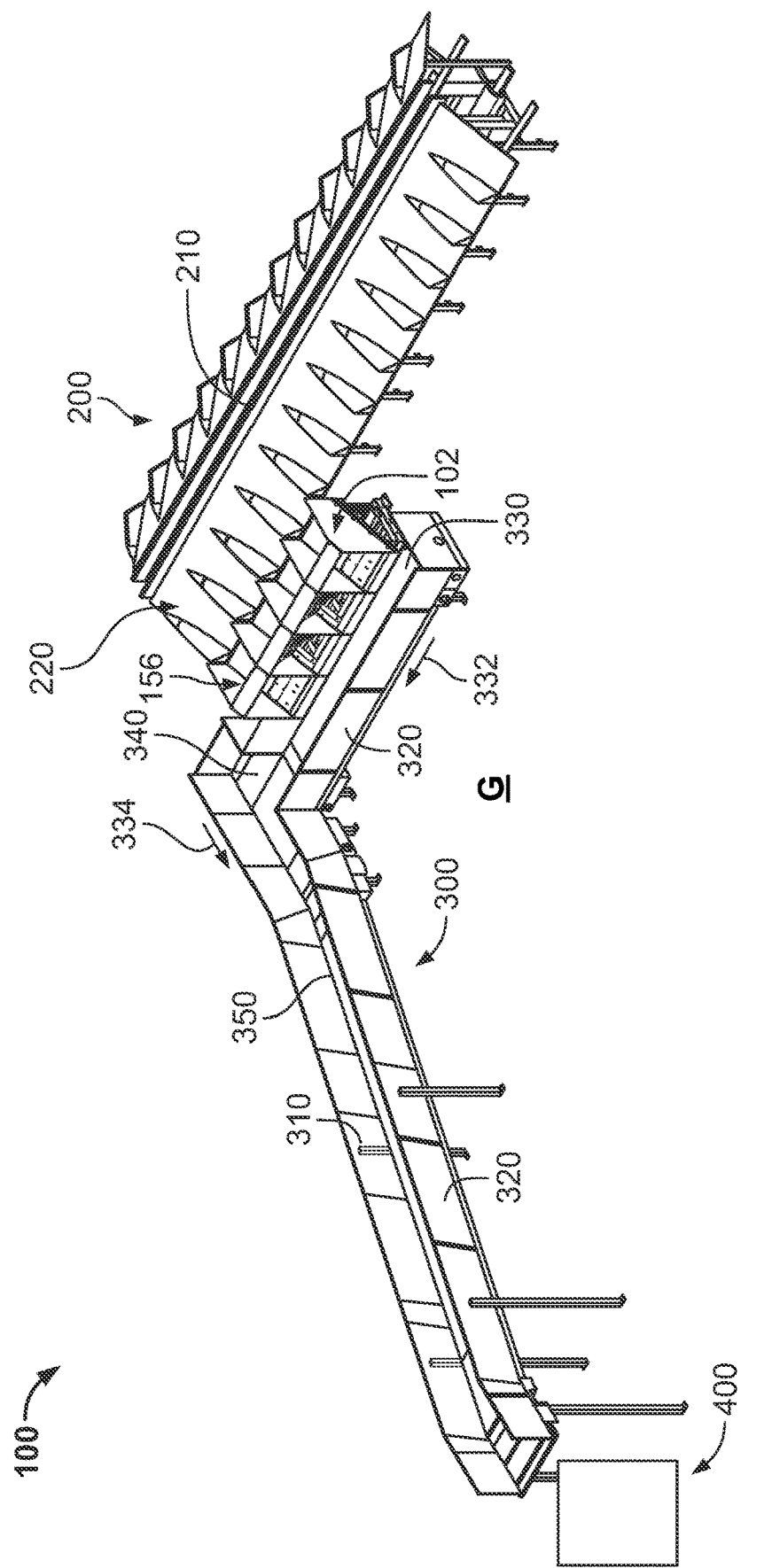
FIG. 1 illustrates a top, front, and right isometric view of an embodiment of a system for sorting and dispensing packages, in accordance with aspects of the present disclosure.

Before any embodiments are explained in detail, it is to be understood that the disclosure is not limited in application to the details of construction and the arrangement of components set forth in the following description or illustrated in the following drawings. The embodiments disclosed herein are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal,"

"vertical," "front," "rear," "left," "right," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features.

The terms "about" and "approximately," as used herein, refer to variations in the numerical quantity that may occur, for example, through typical measuring and manufacturing procedures; through inadvertent error in manufacturing processes; through differences in the manufacture, source, or materials used to make the articles of manufacture described herein; and the like. Throughout the disclosure, the terms "about" and "approximately" may refer to a range of values±5% of the numeric value that the term precedes.

Also as used herein, unless otherwise expressly limited or defined, the terms "automatically," "autonomously," and the like, particularly in regard to systems or methods herein, refers to operations that are at least partly dependent on electronic application of computer algorithms for decision-making without human intervention. In this regard, unless otherwise expressly limited or defined, "automatic operations" and the like, unless otherwise expressly limited or defined, refers to a subset of automatic operations for which no intervention by a human operator is required. However, operator input may sometimes be received to start, stop, interrupt, or define parameters for such automated operations.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from the embodiments disclosed herein. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the disclosure.

As an initial matter, packages or parcels can be broken into multiple classes, including "small," i.e., packages that are smaller than a standard sized package, "big," i.e., normal-sized packages having a weight that does not exceed what can be commonly handled, and "irregular," i.e., packages having particular dimensions, shapes, or weights that are too ungainly to be processed and transported conventionally and cannot be classified as either "small" or "big." Packages can be of varying shapes, weights, and sizes within each of the multiple classes. Current processes for sorting and dispensing packages in material handling facilities include manual, personnel-intensive operations for sorting packages, particularly in facilities that processes primarily small class packages. However, many conventional manual processes can be time intensive, labor intensive, and prone to error.

Other conventional processes for material handling facilities can be automated, but can require large, costly equipment. Further, such automated equipment can occupy a substantial amount of surface area on a warehouse floor, can be difficult to transport, and can be difficult to install. Still further, such automated equipment can be difficult to maintain because components that require service may be inaccessible to an operator or require disassembly of other components to perform such maintenance. In summation, such automated equipment is typically expensive to construct due to materials fees, house due to the inherent value of warehouse space, transport for installation, and maintain due to the inaccessibility of components that may require servicing or replacement.

These deficiencies of conventional systems and methods for sorting and dispensing packages are particularly problematic for contexts in which high volumes of packages need to be sorted and dispensed. For example, large courier services such as the United Parcel Service (UPS®) and the United States Postal Service (USPS®) require systems and methods for sorting and dispensing packages that can accommodate a high volume of packages at a relatively low cost. As such, lower costs of such sorting and dispensing processes can be achieved by reducing materials fees for manufacturing automated equipment, the amount of warehouse space required by the automated equipment, or the down time of such automated equipment by designing equipment or components that can be easily serviced. Further, these large courier services have a plethora of facilities scattered across geographic locations. Therefore, by transporting systems for sorting and dispensing packages having a compact, ergonomic design between various facilities.

Embodiments of the present disclosure can address one or more of these identified shortcomings. For example, some embodiments of the present disclosure provide a system for dispensing and sorting packages having a compact, ergonomic design that is easy to transport and easy to service. The system can include a flip gate assembly that includes an inclined surface, a base, one or more support legs extending from the base to the inclined surface, an actuator attached to the base, and a flip gate disposed on the inclined surface. The flip gate can be configured to actuate between a first configuration (e.g., an "up" or extended configuration) and a second configuration (e.g., a "down" or retracted configuration) with respect to the inclined surface. Generally, the flip gate assembly disclosed herein has a compact, ergonomic design that allows for sorting and dispensing a relatively high volume of packages at a relatively high rate of speed with minimized errors.

Figure 2:
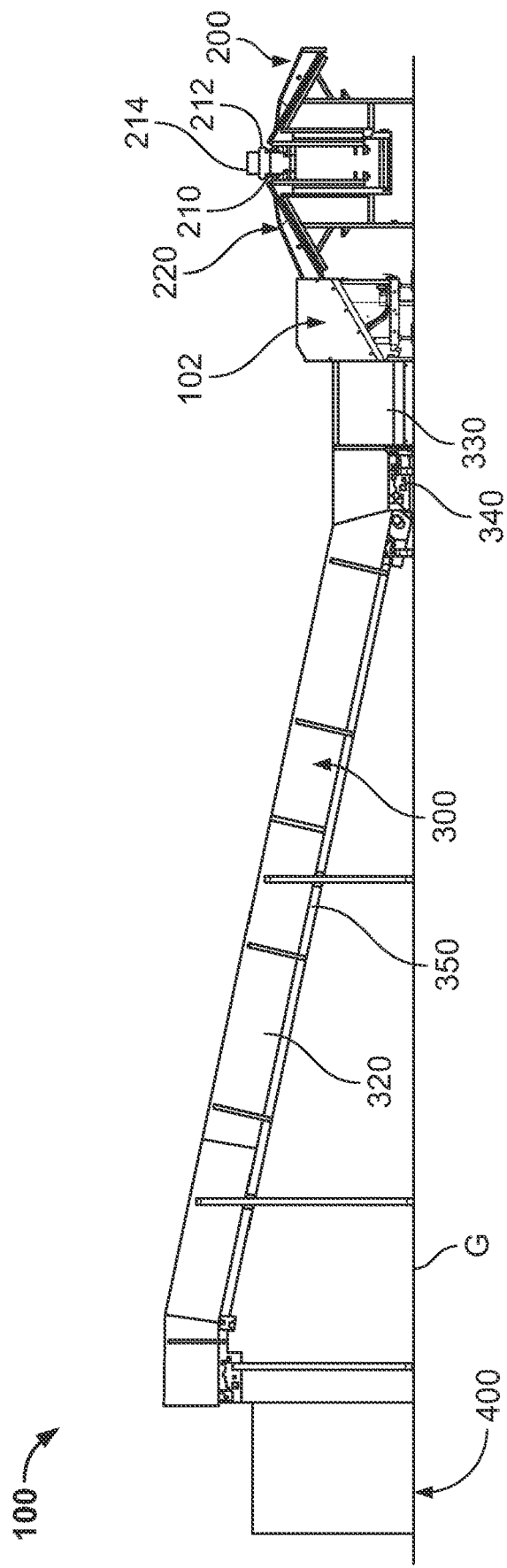
FIG. 2 illustrates a right elevational view of the system of FIG. 1.

Referring now to FIGS. 1 and 2, an embodiment of a system 100 for sorting and dispensing packages is shown. In the illustrated embodiment, the system 100 includes a flip gate assembly 102, a tilt tray system 200, a conveyor system 300, and a bagging system 400. In some embodiments, the flip gate assembly 102 may be positioned adjacent to the tilt tray system 200 on a ground surface "G," such as a warehouse or factory floor, such that a plurality of packages 214 (see FIG. 2) can be dispensed from the tilt tray system 200 and received by the flip gate assembly 102. Similarly, the conveyor system 300 may be positioned adjacent to the flip gate assembly 102 on the ground surface "G" such that the packages 214 can be transferred from the flip gate assembly 102 to the conveyor system 300. Likewise, the bagging system 400 may be positioned adjacent to the conveyor system 300 on the ground surface "G" such that the packages 214 can be transferred from the conveyor system 300 to the bagging system 400.

In the illustrated embodiment, a particular package 214 may flow from the tilt tray system 200 to the flip gate assembly 102, then to the conveyor system 300, and then to the bagging system 400. In some embodiments, the system 100 can include only one or more of: the flip gate assembly 102, the tilt tray system 200, the conveyor system 300, or the bagging system 400. For example, in some embodiments, the system 100 may not include the bagging system 400. In some embodiments, the system 100 can include two or more of each of: the flip gate assembly 102, the tilt tray system 200, the conveyor system 300, or the bagging system 400. For example, in some embodiments, the system 100 can include two or more flip gate assemblies 102 and/or two or more conveyor systems 300.

Still referring to FIGS. 1 and 2, the tilt tray system 200 of the system 100 includes a tilt tray conveyor 210 along which a plurality of tilt trays 212 (see FIG. 2) can travel. Each of the tilt trays 212 can carry one or more packages 214 (see FIG. 2) along the tilt tray conveyor 210 in one or more directions. The tilt trays can be configured to accommodate packages 214 that may be of a variety of different sizes, shapes, and weights. Further, each tilt tray 212 is configured to be tiltable relative to the tilt tray conveyor 210 to bias the package 214 onto one of a plurality of tilt tray chutes 220, i.e., partially enclosed spaces that are configured to receive and guide one or more packages 214 from the tilt tray conveyor 210. In some embodiments, the tilt tray 212 can be tilted via an automated process that takes into account any number of variables, such as a priority, intended destination, class, or weight of the package 214 being transported on the particular tilt tray 212. In some embodiments, and as discussed in greater detail below, the flip gate assembly 102 may include a plurality of flip gate chutes 156 (see FIG. 3) that are arranged to align with at least a portion of the tilt tray chutes 220. Thus, in such embodiments, when a tilt tray 212 is tilted toward a particular tilt tray chute 220, the package 214 carried on such tilt tray 212 slides into the tilt tray chute 220 from the tilt tray 212 and can be received within the corresponding flip gate chute 156 of the flip gate assembly 102.

The conveyor system 300 of the system 100 may include a first conveyor sidewall 310 and a second conveyor sidewall 320. The first and second conveyor sidewalls 310, 320 may be configured to prevent the packages 214 from falling off the conveyor system 300 during transport from the flip gate assembly 102 to the bagging system 400. The conveyor system 300 may include a first conveyor section 330 that extends along a constant elevation in a first direction 332 (see FIG. 1). The conveyor system 300 may further include a second conveyor section 340 that is disposed adjacent to the first conveyor section 330 and extends along a constant elevation in a second direction 334 (see FIG. 1). In the illustrated embodiment, the first direction 332 of the first conveyor 330 is substantially perpendicular to the second direction 334 of the second conveyor 340. In some embodiments, the first direction 332 can be oblique to the second direction 334. The conveyor system 300 may further include a third conveyor section 350 that extends along a variable elevation from the second conveyor section 340. The first and second conveyor sidewalls 310, 320 may be laterally opposed along outer lateral sides of each of the first, second, and third conveyor sections 330, 340, 350.

Still referring to FIGS. 1 and 2, the first conveyor section 330 may be arranged adjacent to the flip gate assembly 102 and can be configured to receive and transport the packages 214 from the flip gate assembly 102 to the second conveyor section 340. The second conveyor section 340 may receive and transfer the packages 214 from the first conveyor section 330 to the third conveyor section 350. The third conveyor section 350 may extend from the second conveyor section 340 to the bagging system 400 to receive and transport the packages 214 from the second conveyor section 340 to the bagging system 400. In the illustrated embodiment, the third conveyor section 350 increases in elevation with respect to the ground surface "G" as it extends from the second conveyor section 340 to the bagging system 400. In some embodiments, the third conveyor section 350 can decrease in elevation or extend at a constant elevation from the second conveyor section 340 to the bagging system 400. In various embodiments, the first, second, and third conveyor section 330, 340, 350 may extend across any length and have any width.

For example, in some embodiments, the third conveyor section 350 may increase in elevation to any height from the ground surface "G." Further, although the illustrated embodiment shows the conveyor system 300 including the first, second and third conveyor sections 330, 340, 350, in other embodiments, the conveyor system 300 may include any number of conveyor sections that may be disposed along a constant elevation or a variable elevation. For example, in some embodiments, the first conveyor section 330 can include a plurality of conveyor sections that each extend from respective chutes of the flip gate assembly 102 to the second or third conveyor sections 340, 350. In the illustrated embodiment, the conveyor system 300 is driven by a motor (not shown) that can be electrically, pneumatically, or hydraulically powered. However, in other embodiments, the conveyor system 300 may otherwise be powered partially, or entirely, by manual operation, or by gravity. In some embodiments, each of the conveyor sections 330, 340, 350 can be driven independently by two or more motors. In such embodiments, the conveyor system 300 can be configured such that a conveyor speed of each of the conveyor sections 330, 340, 350 can be uniform or varied depending on one or more sensed or predetermined operating conditions of the system 100.

In some embodiments, one or more sensors (not shown) of the system 100 can be disposed along one or more conveyor sections 330, 340, 350 of the conveyor system 300. For example, in some embodiments, a proximity sensor or barcode scanner can be arranged along the sidewalls 310, 320 to detect or track the packages 214 flowing down the conveyor system 300. In some embodiments, the conveyor system 300 can include one or more selectively moveable gates or barriers that can be configured to restrict or direct the flow of the packages 214 along one or more of the conveyor sections 330, 340, 350. For example, in some embodiments, a gate (not shown) can be arranged between the at the end of the third conveyor section 350 to selectively restrict flow of the packages 214 from the conveyor system 300 to the bagging system 400.

With continued reference to FIGS. 1 and 2, the bagging system 400 of the system 100 is arranged at the end of the third conveyor 350 and may generally include a bagging chute or bagging rails (not shown) that receives the packages 214 from the conveyor system 300. In some embodiments, the bagging chute may feed the packages 214 into bags or containers (not shown) that can be held open by an operator. Therefore, the bags or containers may generally be opened to receive the packages 214 from the conveyor system 300 via manual operation. In some embodiments, the bagging chute may feed the packages 214 into bags or containers on material handling vehicles that carry the bagged or contained packages to another station or worksite for further processing. Generally, it is contemplated that automated arms from a machine (not shown) may open the bags or containers to receive the packages 214 from the conveyor system 300. In further embodiments, the bagging system 400 may include a support frame (not shown) that supports the bagging chute at a distance above the ground surface "G," such that gravity can carry the packages 214 from the end of the third conveyor section 350 of the conveyor system 300 into one or more bags or containers.

In some embodiments, the bagging chute may be a primary bagging chute and the bagging system 400 may include a plurality of secondary bagging chutes (not shown) that are connected to the primary bagging chute. In such embodiments, a lever (not shown) may control the flow of packages from the primary bagging chute to bags or containers at a bottom end of each of the plurality of secondary bagging chutes. In some embodiments, the bagging system 400 can include two or more primary bagging chutes that are configured to receive packages from two or more conveyor sections. The bags discussed herein may be any type of bag, such as nylon bags, plastic bags, fabric bags, or standard material handling bags that are commonly used by courier services. The containers discussed herein may be any type of container, such as wooden containers, or plastic containers. Further, the bags and containers may be any size, for example, the bags may be standard sized bags commonly used by courier services.

Figure 3:
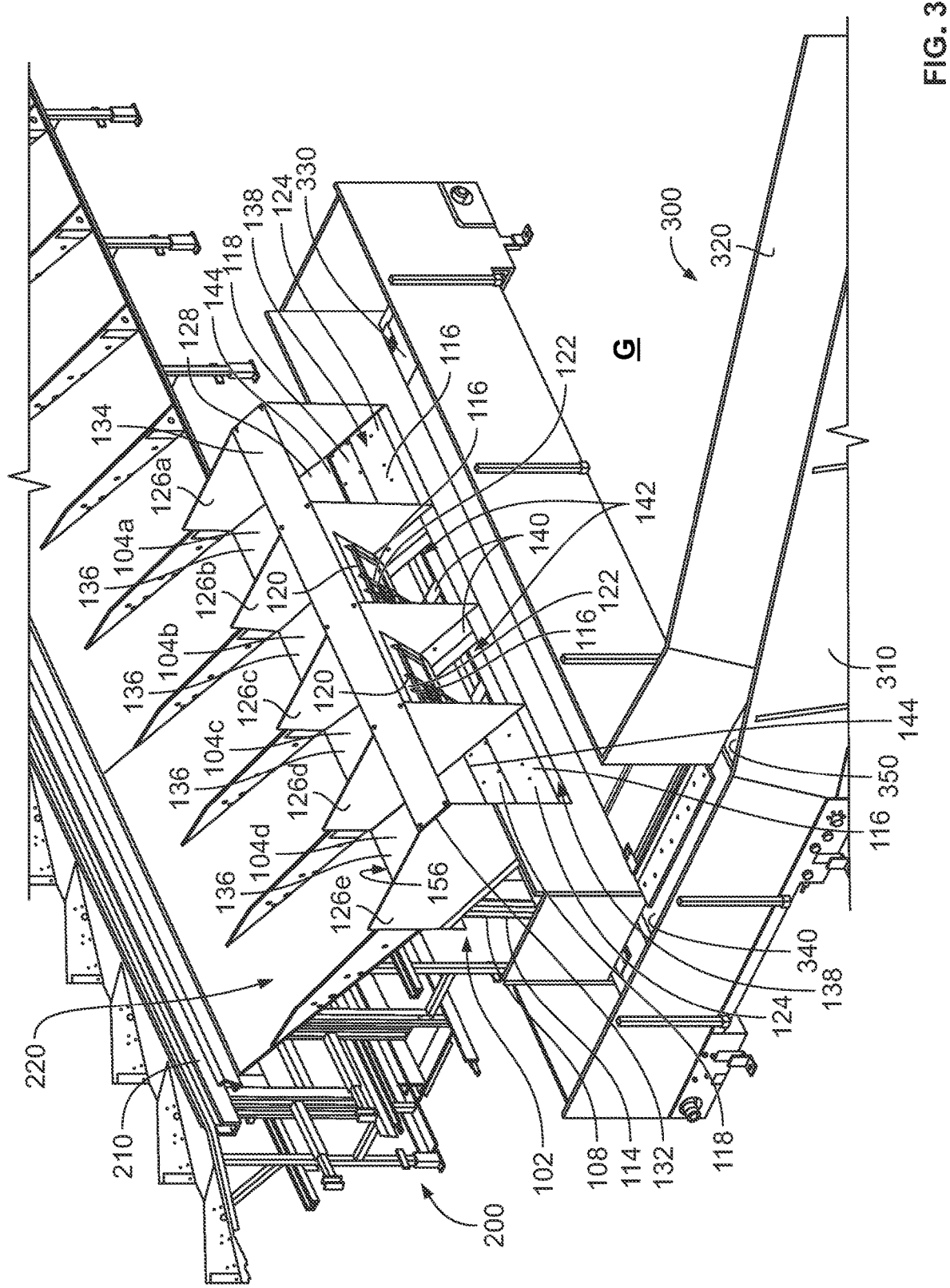
FIG. 3 illustrates a detail view of a top, front, and left isometric view of a flip gate assembly of the system of FIG. 1.
Figure 4:
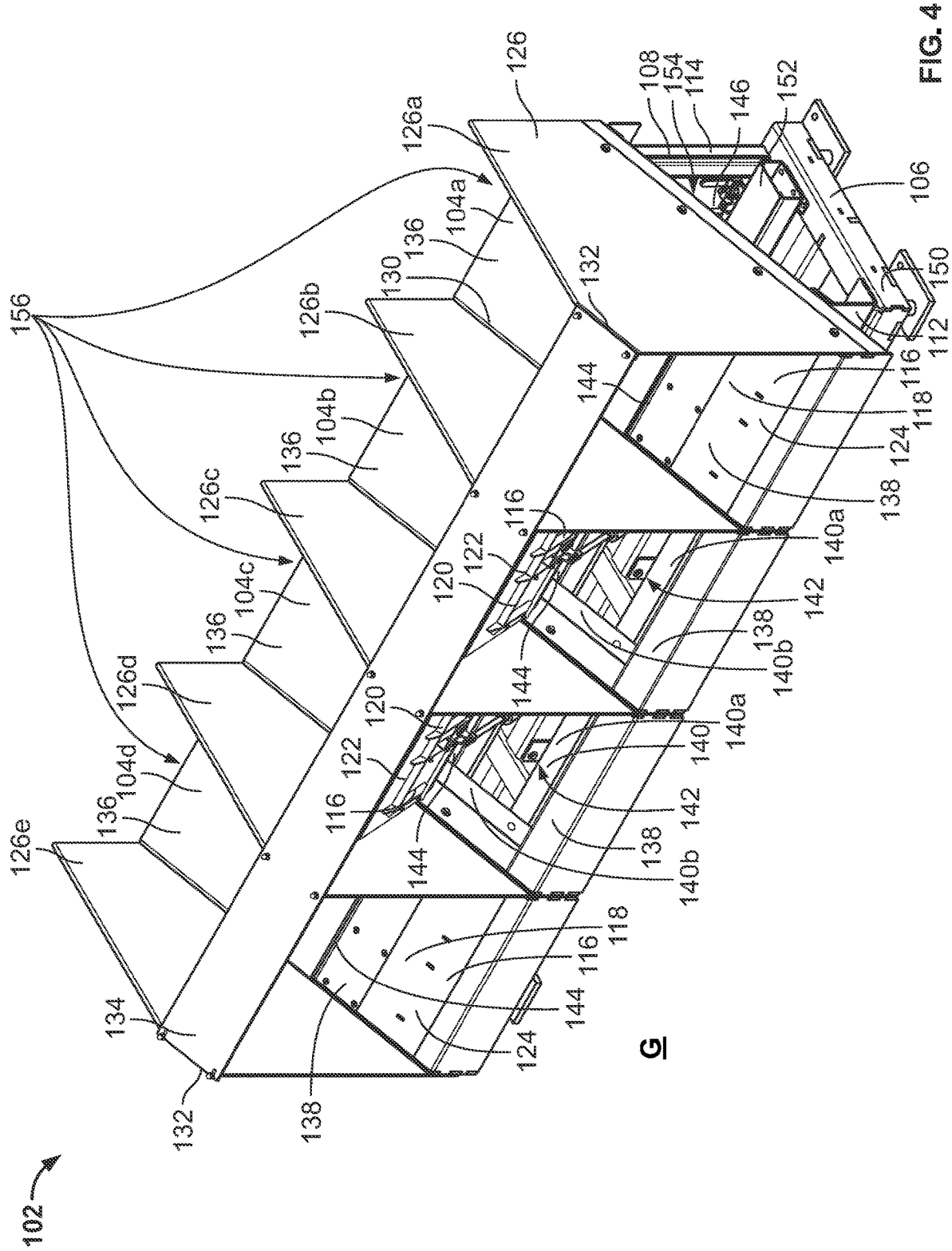
FIG. 4 illustrates a top, front, and right isometric view of the flip gate assembly of FIG. 3.
Figure 7:
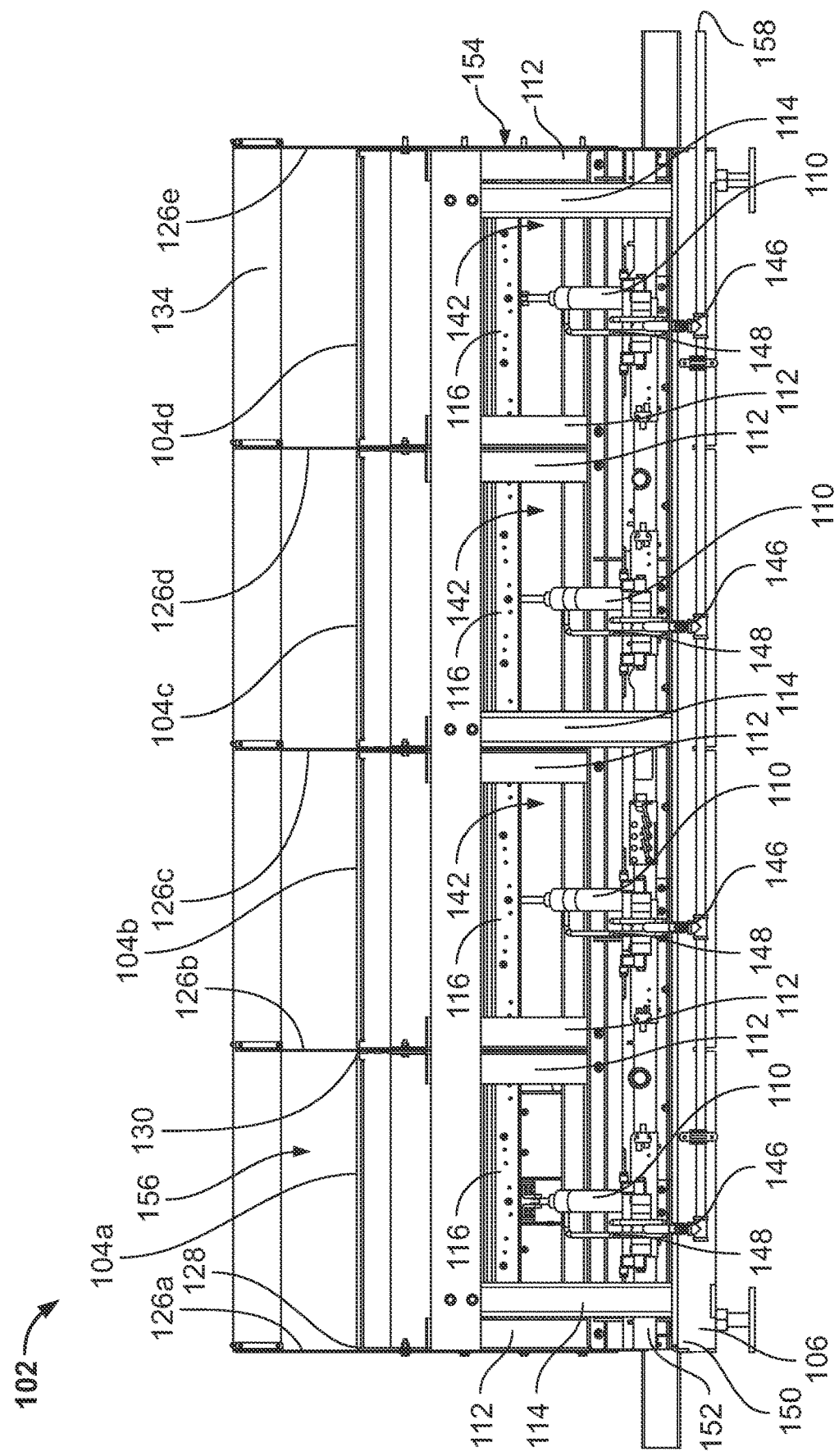
FIG. 7 illustrates a rear elevational view of the flip gate assembly of FIG. 3.

Referring to FIG. 3, a detailed view of the flip gate assembly 102 of the system 100 is shown arranged with the tilt tray system 200 and the conveyor system 300. For illustration purposes, the flip gate assembly 102 and the conveyor system 300 are shown extending along only a portion of one longitudinal side of the tilt tray system 200. In some embodiments, the flip gate assembly 102 and the conveyor system 300 extend a length that is greater than or equal to a length of the tilt tray system 200. For example, in some embodiments, two or more flip gate assemblies 102 can be arranged in series along the tilt tray system 200. In some embodiments, a first flip gate assembly 102 can be arranged on one longitudinal side of the tilt tray system 200 and a second flip gate assembly 102 can be arranged on the other longitudinal side of the tilt tray system 200. In such embodiments, this modularity aspect of the flip gate assembly 102 can be particularly beneficial in providing ease of transport and installation of the at least the flip gate assembly 102 of the system 100. The flip gate assembly 102 includes one or more inclined surfaces 104, a base 106, one or more support legs 108 that extend vertically from the base 106 to the one or more inclined surfaces 104 (see FIG. 4), and one or more actuators 110 (see FIG. 7) pivotably attached to the base 106. Referring to FIG. 4, the one or more support legs 108 may include one or more front support legs 112 and one or more rear support legs 114. In some embodiments, the support legs 108 may further include one or more central support legs (not shown) arranged between the front and rear support legs 112, 114.

Referring again to FIG. 2, in the illustrated embodiment, the inclined surfaces 104 are disposed at an angle that is substantially equal to an angle of the tilt tray chutes 220 of the tilt tray system 200. In some embodiments, the inclined surfaces 104 of the flip gate assembly 102 can be disposed at an angle greater than or less than an angle of the tilt tray chutes 220 of the tilt tray system 200. Referring again to FIG. 3, in the illustrated embodiment, the one or more inclined surfaces 104 are generally rectangular in shape. In some embodiments, the one or more inclined surfaces 104 can have a triangular shape.

Figure 5:
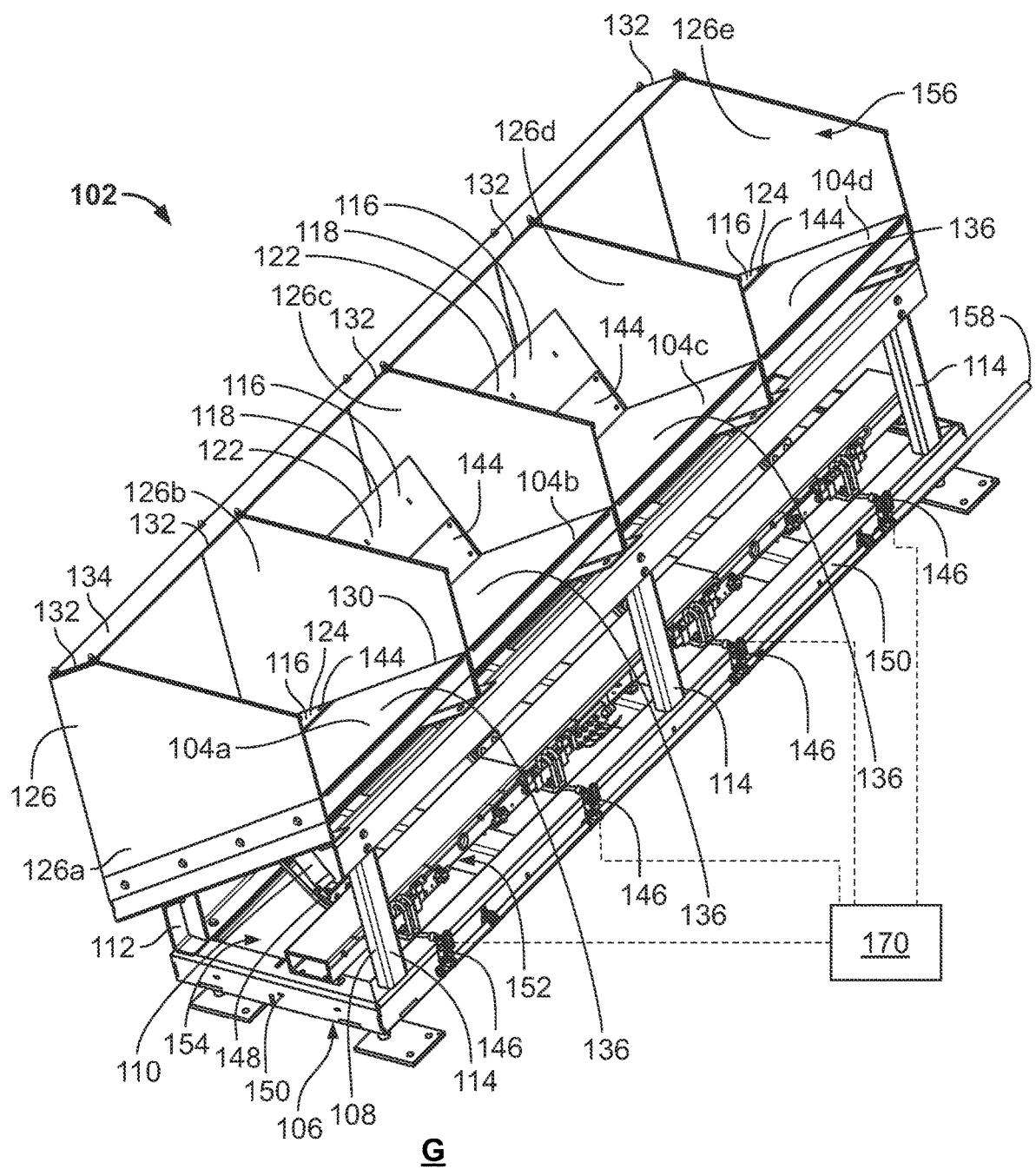
FIG. 5 illustrates a top, rear, and right isometric view of the flip gate assembly of FIG. 3.

Referring to FIGS. 4 and 5, the flip gate assembly 102 further includes one or more flip gates 116 that are pivotally attached to each of the one or more inclined surfaces 104, respectively. The flip gates 116 include a first or top side 118 and a second or bottom side 120, opposite the top side 118. The flip gates 116 can be configured to actuate or pivot between a first or extended configuration 122 and a second or retracted configuration 124. In the illustrated embodiment, each of the flip gates 116 is pivotally coupled with corresponding actuators 110 (see FIG. 7) that pivots the flip gate 116 relative to the corresponding inclined surface 104 via movement of the actuator 110 between a first or extended position, in which the respective flip gate 116 is in the extended configuration 122, and a second or retracted position, in which the respective flip gate 116 is in the retracted configuration 124.

In some embodiments, the actuators 110 can be configured to be moveable between one or more partially extended positions between the extended and retracted positions, and thereby the flip gates 116 can be moveable between one or more partially extended configurations between the retracted and extended configurations 122, 124. In some embodiments, two or more flip gates 116 of the flip gate assembly 102 can be simultaneously actuated by a single actuator 110. Alternatively, in other embodiments, two or more actuators 110 may be pivotally coupled with and simultaneously used to actuate a single flip gate 116. For example, in such embodiments, a first actuator 110 can be pivotally coupled to a first lateral side of the flip gate 116 and a second actuator 110 can be pivotally coupled to a second lateral side of the same flip gate 116. In a preferred embodiment, the actuators 110 are pneumatic actuators; however, in alternate embodiments, the actuators 110 may be electrical actuators, hydraulic actuators, or any other type of actuator. In some embodiments, one or more of the actuators 110 can be a pneumatic actuator and the other actuators can be a different type of actuator.

Referring specifically to FIG. 5, one or more actuator valves 146 may be disposed on the base 106 of the flip gate assembly 102 and each in fluid communication with a fluid supply line 158. Conduits or hoses 148 may extend from the one or more actuator valves 146 to the one or more actuators 110 to provide fluid communication between the corresponding actuator valve 146 and the actuator 110. In the illustrated embodiment, each of the actuators 110 have a corresponding actuator valve 146 and thereby, in some instances, one of the flip gates 116 can be moved to or remain in the extended configuration 122 while one or more of the other flip gates 116 can be moved to or remain in the retracted configuration 124. In some embodiments, one actuator valve 146 can be in fluid communication with two or more actuators 110 and thereby, the two or more corresponding flip gates 116 can be simultaneously moved to or remain in the extended or retracted configurations 122, 124. In some embodiments, a fluid manifold (not shown) can be included on the flip gate assembly 102 to provide simultaneous fluid communication between two or more actuators 110.

With continued reference to FIG. 5, the one or more actuator valves 146 can be configured to permit or restrict flow from the fluid supply line 158 to the corresponding actuators 110 based on one or more operating conditions, e.g., that can be sensed or predetermined by the system 100, to selectively move the actuators 110 between the extended and retracted positions. For example, in some embodiments, the flip gate assembly 102 can include a controller 170 that can be external or internal to the flip gate assembly 102 or the system 100 and can be in electrical communication with each of the actuator valves 146. In such embodiments, the controller 170 can be configured to control the one or more actuator valves 146 via one or more signals received by the actuator valve 146 to provide or restrict fluid flow through the hoses 148 to the one or more actuators 110, and thereby controlling the actuators 110 to move between the extended and retracted positions and the one or more flip gates 116 to move between the extended and retracted configurations 122, 124. In such embodiments, the controller 170 can be configured to receive signals from one or more sensors, such as a proximity sensor, and, in response to the one or more signals received from the sensors, selectively actuate one or more of the actuators 110 via one or more signals received from the controller 170.

In some embodiments, the actuator valves 146 can be a solenoid valve that is configured to receive one or more signals from the controller 170 or directly from one or more sensors (not shown) of the system 100 and, in response to the receiving the one or more signals, permit or restrict flow to the corresponding actuator 110. In some embodiments, the controller 170 can be configured to move the one or more actuators 110 to the extended position for a predetermined period of time and, after expiration of the predetermined period of time, automatically move the one or more actuators to the retracted position. In some embodiments, the controller 170 can be further configured to receive one or more signals from one or more sensors of the flip gate assembly 102 or of other components of the system 100 and to determine whether to actuate one or more of the actuators 110 based on the received signals.

In some embodiments, the controller 170 can be configured to receive and/or store one or more user inputs. In such embodiments, a user can set or adjust a period of time or intervals in which the actuators 110 are to be actuated. In some embodiments, the controller 170 can be in electrical or wireless communication with a computer (not shown) that can be internal or external to the system 100. In such embodiments, a user can control or set predetermined time intervals for the actuators 110 to be actuated on a graphical user interface of the computer. In some embodiments, the computer can be in electrical communication with one or more sensors of the system 100 or of a larger system that incorporates the system 100 and can be configured to send signals to the controller 170 or to the actuator valves 146. In such embodiments, a computer algorithm can be stored and operated on the computer or a network of computers to automatically, i.e., autonomously, determine and control the actuators 110 based on signals received by the computer or network of computers and processed by the computer algorithm.

Figure 6:
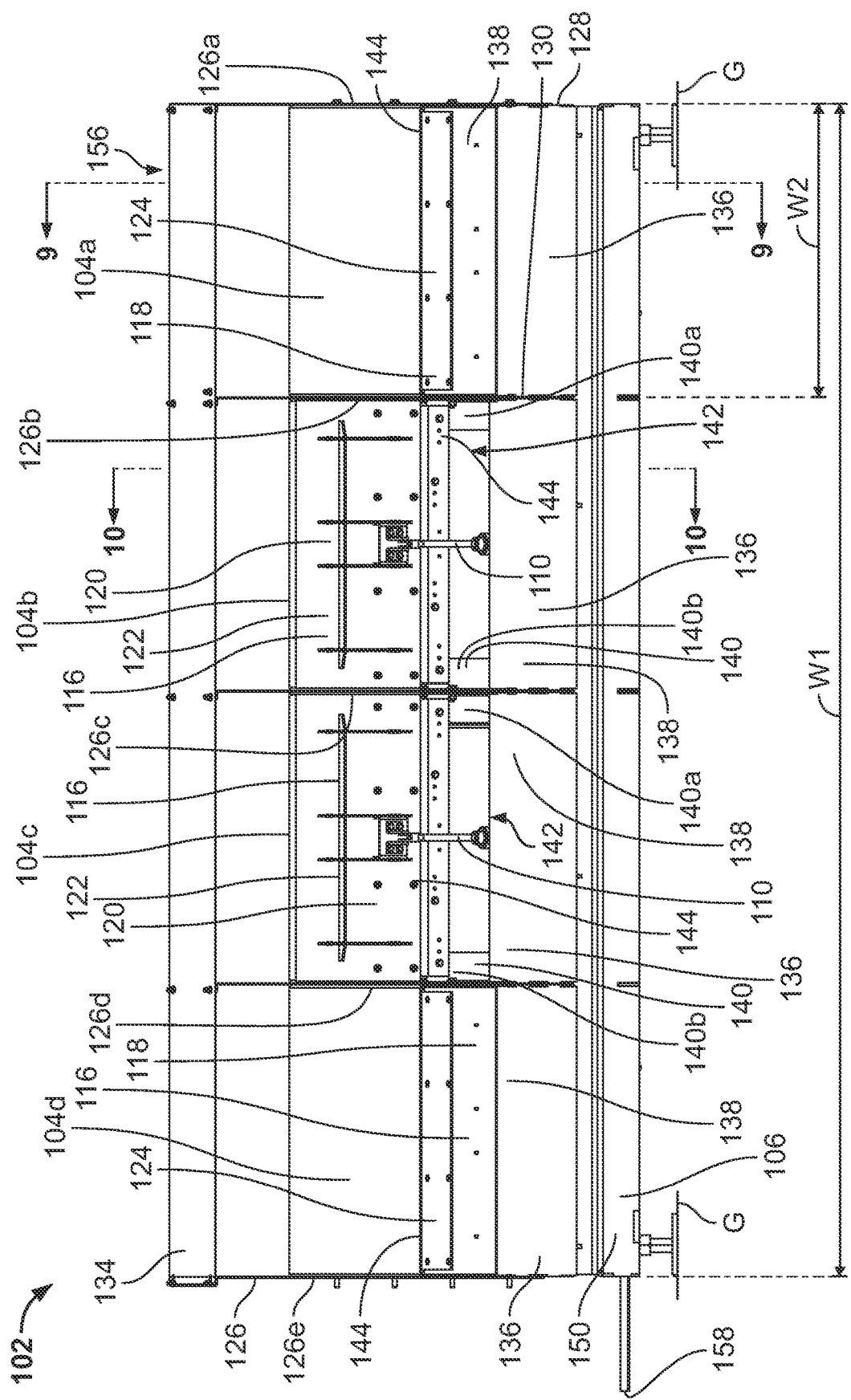
FIG. 6 illustrates a front elevational view of the flip gate assembly of FIG. 3.

Referring to FIGS. 5 and 6, the flip gate assembly 102 may further include a plurality of sidewalls 126 that can extend vertically along each of a first or right lateral side 128 (see FIG. 6) and a second or left lateral side 130 of the one or more inclined surfaces 104. For example, in the illustrated embodiment, a first sidewall 126a extends vertically along the first side 128 (see FIG. 6) of a first inclined surface 104a, and a second sidewall 126b extends vertically along the second side 130 of the first inclined surface 104a. As such, the first inclined surface 104a, the first sidewall 126a, and the second sidewall 126b together define a flip gate chute 156 (see FIG. 3), i.e., a partially enclosed structure configured to receive the one or more packages 214 (see FIG. 2), that aligns with one or more of the corresponding tilt tray chutes 220 of the tilt tray system 200. The respective sidewalls 126 may be generally trapezoidal in shape with a cutout or notch 132 in a corner of the sidewall 126 that is opposite to the inclined surface 104. The sidewalls 126 may be coupled to the one or more inclined surfaces 104, for example, via fasteners, welding, or adhesion. Referring again to FIG. 3, the tilt tray chutes 220 of the tilt tray system 200 and the flip gate chutes 156 of the flip gate assembly 102 together provide a receiving area for the one or more packages 214 to be held when the corresponding flip gate 116 is in the extended configuration 122. Thus, when the corresponding flip gate 116 is actuated to the retracted configuration 124, the one or more packages 214 held in the flip gate chute 156 and the tilt tray chute 220 are free to slide down the corresponding inclined surface 104 to the conveyor system 300. In the illustrated embodiment, the flip gate assembly 102 includes four total flip gate chutes 156 and the tilt tray system 200 includes at least five total tilt tray chutes 220. In some embodiments, a total number of flip gate chutes 156 of the flip gate assembly 102 is greater than or equal to a total number of tilt tray chutes 220 of the tilt tray system 200.

Further, as illustrated in FIGS. 3-7, in embodiments in which more than one inclined surface 104 are disposed adjacent to each other, the inclined surfaces 104 may share a sidewall 126 therebetween. For example, in the illustrated embodiment, the flip gate assembly 102 includes the first inclined surface 104a, a second inclined surface 104b, a third inclined surface 104c, and a fourth inclined surface 104d disposed adjacent to each other, respectively. Therefore, in the illustrated embodiment, the flip gate assembly 102 includes the first sidewall 126a and the second sidewall 126b, as described above, and further includes a third sidewall 126c, a fourth sidewall 126d, and a fifth sidewall 126e that are disposed in a similar fashion as the first and second sidewall 126a, 126b. In other embodiments, the flip gate assembly 102 may include any number of inclined surfaces with sidewalls arranged in a similar manner as described above. For example, in some embodiments, the flip gate assembly 102 can include five or more inclined surfaces with five or more sidewalls. In some embodiments, the flip gate assembly 102 can include more inclined surfaces than sidewalls.

To reinforce the stability of the sidewalls 126 of the flip gate assembly 102 during operation of the system 100 as the packages 214 (see FIG. 2) may bump into the sidewalls 126, a stability bar or mounting bar 134 may extend across each notch 132 in the sidewalls 126. The stability bar 134 may be coupled to the sidewalls, for example, by welding or fasteners. During operation, the stability bar 134 is configured to reduce moments of force (i.e., the physical definition of moments of force) applied to the sidewalls 126. In addition to providing reinforcement, the stability bar 134 may hold or support a plurality of sensors, cameras, or lights (not shown). For example, in some embodiments, a plurality of proximity sensors (not shown) can be mounted to the stability bar 134 and can be configured to count a number of the packages 214 that are dispensed by the flip gate assembly 102. Alternatively or additionally, in some embodiments, a plurality of bar code scanners or cameras can be mounted to the stability bar 134 to track specific packages 214 flowing through the flip gate assembly 102.

Figure 9:
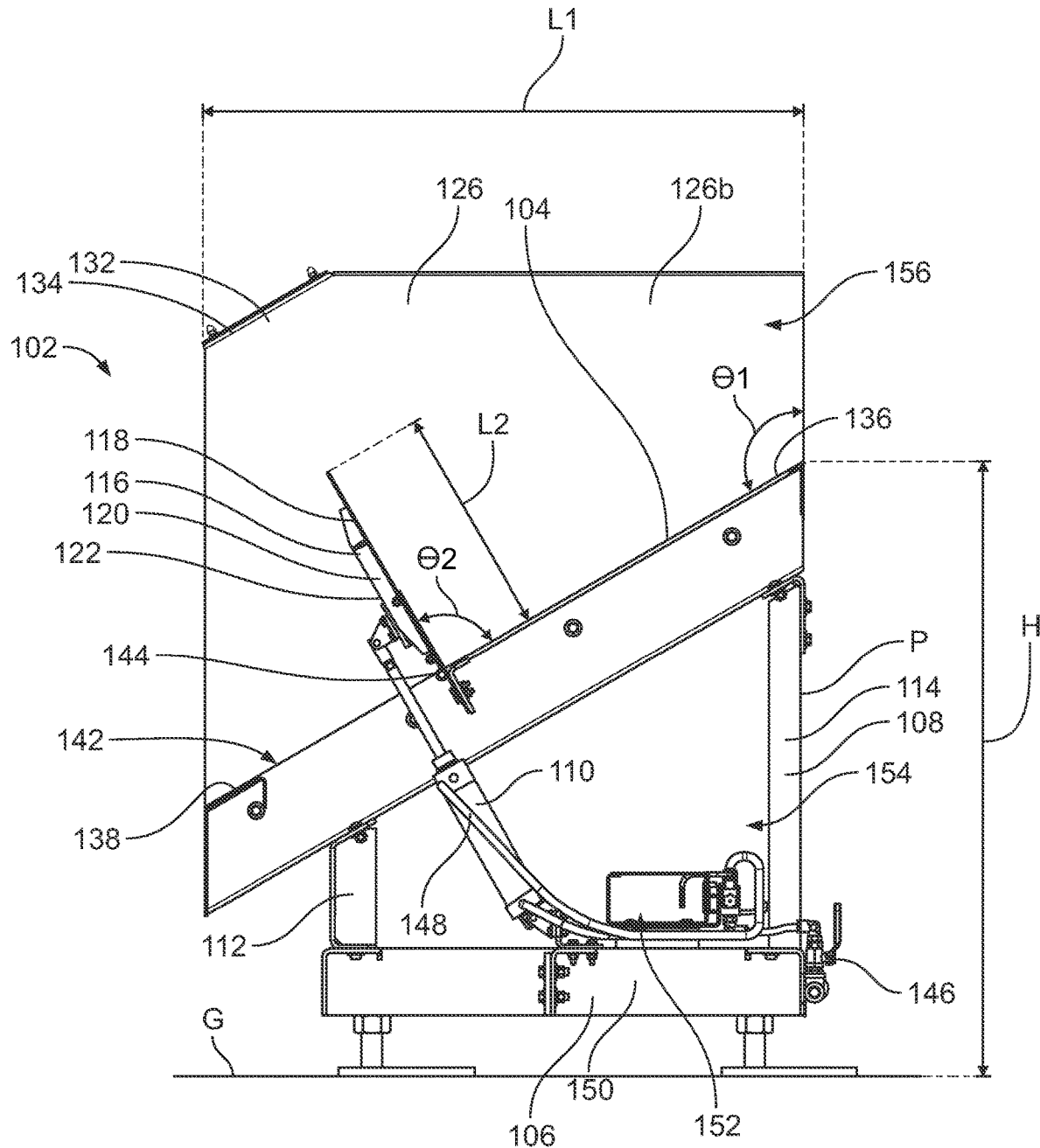
FIG. 9 illustrates a cross sectional view taken along line 9-9 of FIG. 6.
Figure 10:
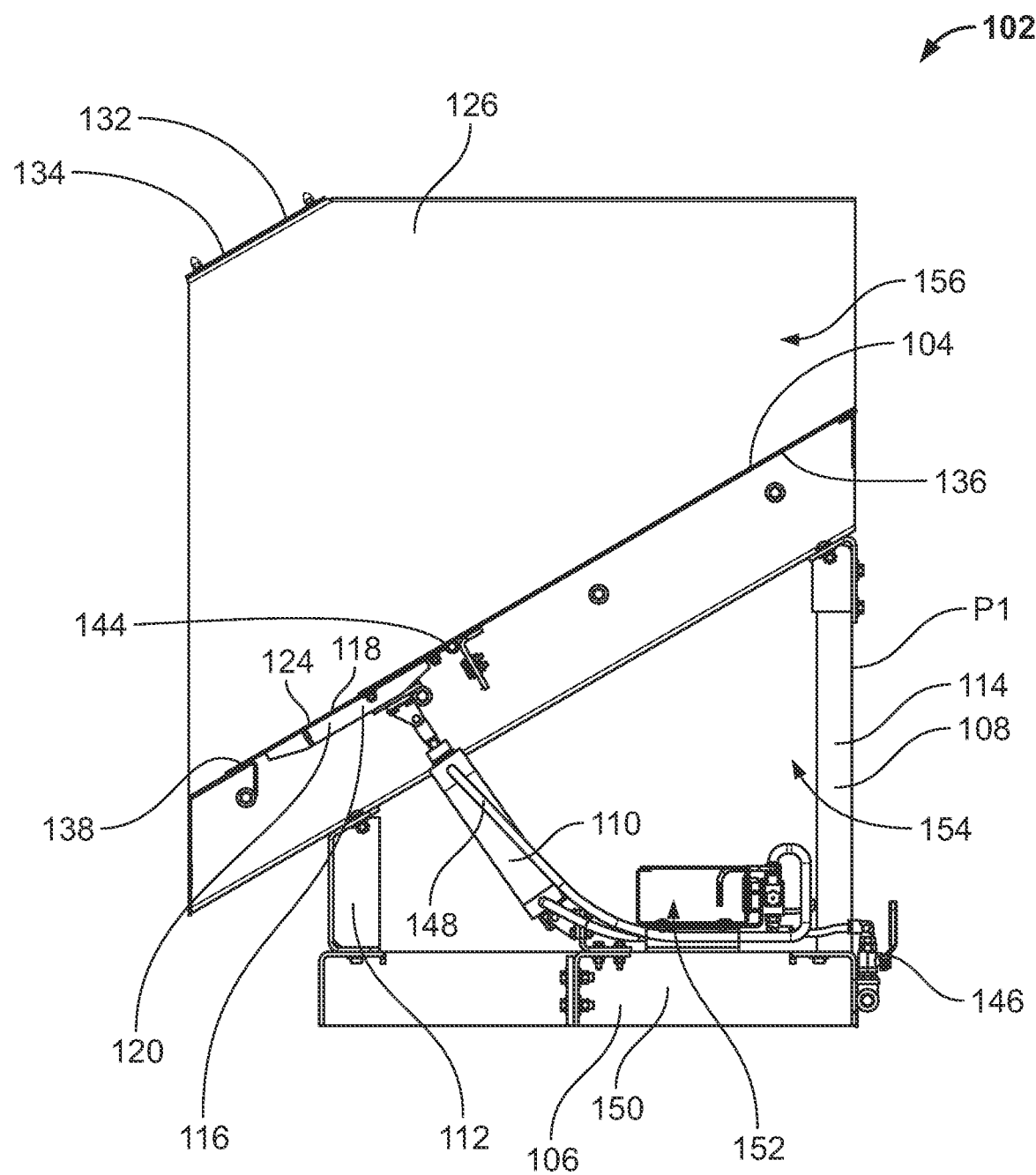
FIG. 10 illustrates a cross sectional view taken along line 10-10 of FIG. 6.

Referring now to FIGS. 9 and 10, the inclined surfaces 104 may be inclined at a first angle $\theta 1$ with respect to a plane P that is defined by the vertically extending rear support legs 114. In some embodiments, the first angle $\theta 1$ may be in a range between about 100 degrees and about 170 degrees, or between about 110 degrees and about 160 degrees, or between about 120 degrees and about 150 degrees, or between about 130 degrees and about 140 degrees, or about 135 degrees. As mentioned above, in some embodiments, the tilt tray chutes 220 of the tilt tray system 200 (see FIG. 3) can extend at an angle (not shown) that is less than, greater than, or equal to the first angle θ1. As shown in FIG. 10, when the one or more flip gates 116 are in the retracted configuration 124, the top side 118 of the flip gate 116 is planar or coextensive with a first or top surface 136 of the respective inclined surface 104 such that the package 214 can slide uninterruptedly downwards along the inclined surface 104. As shown in FIG. 9, when the one or more flip gates 116 are in the extended configuration 122, the top side 118 of the flip gate 116 forms a second angle θ2 with the top surface 136 of the respective inclined surface 104. The second angle θ2 may be in a range of between about 30 degrees and about 150 degrees. Alternatively, in some embodiments, the second angle θ2 may be in a range of between about 40 degrees and about 140 degrees, or about 50 degrees and about 130 degrees, or about 60 degrees and about 120 degrees, or about 70 degrees and about 110 degrees, or about 80 degrees and about 100 degrees, or about 85 degrees and about 95 degrees.

Referring again to FIG. 4, the one or more inclined surfaces 104 include a lower portion 138 with a depressed region 140. The depressed region 140 is formed by a first depressed panel or wall 140a and a second depressed panel or wall 140b, and is dimensioned to receive and support the flip gate 116 in the retracted configuration 124. As shown in FIG. 10, the depressed region 140 is configured such that the top side 118 of the flip gate 116 is planar with respect to the top surface 136 of the respective inclined surface 104 in the retracted configuration 124 such that the package 214 can slide uninterruptedly downwards along the inclined surface 104 and the top side 118 of the flip gate 116. In some embodiments, at least the top side 118 of the flip gate 116 and the top surface 136 of the inclined surface 104 can include a coating or layer, such as a vinyl layer, to provide reduced friction with a sliding package 214 along the inclined surface 104.

Referring still to FIG. 4, an opening 142 is formed in the depressed region 140 between the first depressed wall 140a and the second depressed wall 140b. In the illustrated embodiment, the opening 142 is generally rectangular in shape, similar to an outer perimeter of the flip gate 116. Accordingly, in some embodiments, the opening 142 can have a triangular, pentagonal, hexagonal or circular shape. The actuator 110 extends from the base 106, through the opening 142, to the bottom side 120 of the flip gate 116 and is pivotably mounted to the bottom side 120 of the flip gate 116. In the illustrated embodiment, the actuator 110 is pivotably mounted near the geometric center or the center of gravity of the bottom side 120 of the flip gate 116. However, in some embodiments, the actuator 110 can be pivotably mounted to other locations on the bottom side 120 of the flip gate 116. For example, in some embodiments, the actuator 110 can be pivotably mounted toward a longitudinal end of the flip gate 116. In some embodiments, the actuator 110 can be pivotably mounted to an edge of a longitudinal end of the flip gate 116. In the illustrated embodiment, the flip gate 116 is configured to rotate about a hinge 144 that is arranged on an edge formed by the top surface 136 of the inclined surface 104 and an upper end of the depressed region 140.

Figure 8:
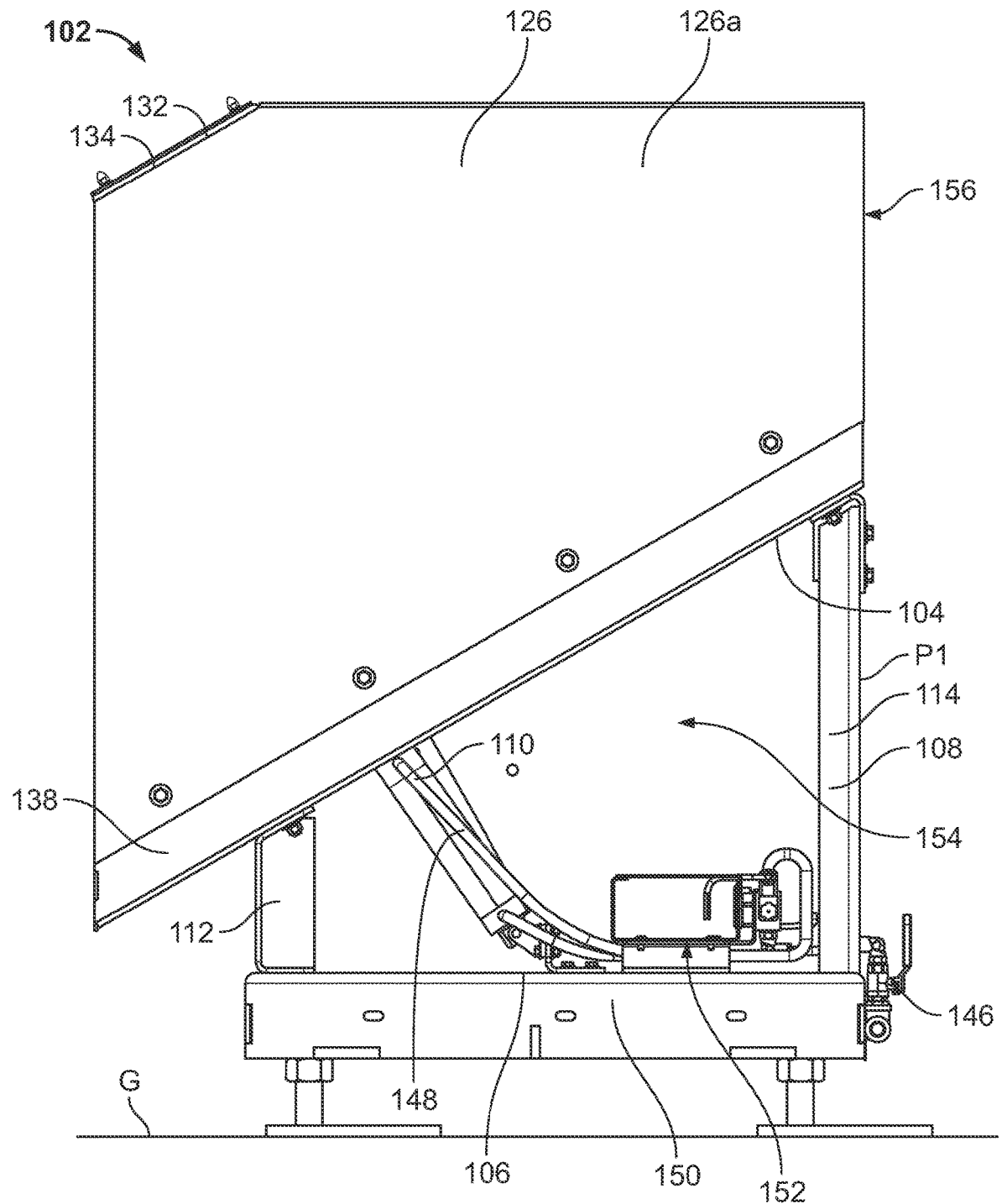
FIG. 8 illustrates a right side elevational view of the flip gate assembly of FIG. 3.

Referring to FIGS. 8-10, the base 106 may be assembled from a plurality of members or extrusions 150. The extrusions 150 may be interconnected via, for example, fasteners or welding. In some embodiments, the extrusions 150 can be comprised of a metal or metallic alloy, such as aluminum, that can provide a reduced weight of the base 106 with sufficient strength. In some embodiments, the base 106 can further include wheels or other structures to provide increased mobility of the system 100 to a user. Further, in the illustrated embodiment, the base 106 has a generally rectangular shape. In other embodiments, the base 106 may have a circular, triangular, pentagonal, or hexagonal shape. A wire or cable holder 152 may be disposed on the base 106 and extend across one or more of the plurality of extrusions 150. The cable holder 152 can enclose or guide one or more electrical or structural cables (not shown) that can interconnect one or more components of the flip gate assembly 102, e.g., the one or more actuator valves 146, or of the system 100.

Referring still to FIGS. 8-10, a service gap 154, i.e., an open space on the rear and lateral sides of the flip gate assembly 102, is defined between the base 106, the one or more front support legs 112, the one or more rear support legs 114, and the one or more inclined surfaces 104. The service gap 154 can be particularly beneficial in providing ease of maintenance of the flip gate assembly 102 by permitting open accessibility to the flip gates 116 and the actuators 110 to a user. Further, such access to components of the flip gate assembly 102 via the service gap 154 can allow a user to see the operations of such components and proactively service or replace such components to reduce downtime of the system 100, thereby providing a reliable and high rate of speed for sorting and dispensing a high volume of packages through the system 100.

As discussed above, the flip gate assembly 102 of the system 100 utilizes a compact, ergonomic design compared to conventional systems. For example, as illustrated in FIG. 6, the illustrated flip gate assembly 102 has four inclined surfaces 104 having a combined width "W1" in a range between about 100 inches and about 120 inches. Alternatively, in other embodiments, the combined width "W1" of the four inclined surfaces 104 may be about 112 inches. Therefore, in some embodiments, each of the four inclined surfaces 104 may have a width "W2" in a range between about 15 inches and about 45 inches, between about 20 inches and about 40 inches, or between about 25 inches and about 35 inches. Alternatively, in other embodiments, each inclined surface 104 may have a width W2 of about 28 inches, or about 30 inches. In some embodiments, a combined width of five or more inclined surfaces 104 of the flip gate assembly 102 can be in a range between about 100 inches and about 400 inches, between about 150 inches and about 350 inches, between about 200 inches and about 300 inches, or between about 225 inches and about 275 inches. In some embodiments, one or more of the inclined surfaces 104 of the flip gate assembly 102 can have a width "W2" that is greater than or less than that of the other inclined surfaces 104 of the flip gate assembly 102.

Further, as illustrated in FIG. 9, the flip gate assembly 102 has a height "H" that extends from the ground surface "G" to the highest point on the inclined surface 104 extending vertically from the ground. In some embodiments, the height "H" of the flip gate assembly 102 can be in a range of between about 20 inches and about 120 inches, between about 40 inches and about 100 inches, between about 60 inches and about 80 inches, or between about 30 inches and about 50 inches. Similarly, the inclined surface 104 has a horizontal length "L1" extending laterally from the plane P to a front side of the flip gate assembly 102. In some embodiments, the horizontal length "L1" of the flip gate assembly 102 can be in a range of between about 20 inches and about 50 inches, between about 30 inches and about 40 inches, or between about 35 inches and about 45 inches. Alternatively, in some embodiments, the horizontal length "L1" may be about 36 inches. Likewise, the flip gate 116 may have a length "L2" relative to the inclined surface 104 when the flip gate 116 is in the extended configuration (as shown in FIG. 9). In some embodiments, the length "L2" of the flip gate 116 can be in a range of between about 5 inches and about 20 inches, between about 10 inches and about 15 inches, or between about 12 inches and about 24 inches. Alternatively, in other embodiments, the length "L2" may be about 13 inches, or about 14 inches.

In some implementations, devices or systems disclosed herein can be used, manufactured, or installed using methods embodying aspects of the disclosure. Correspondingly, any description herein of particular features, capabilities, or intended uses of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated, discussion herein of any method of manufacturing or use for a particular device or system, including installing the device or system, is intended to inherently include disclosure, as embodiments of the invention, of the utilized features and configurations, and implemented capabilities of such device or system.

Figure 11:
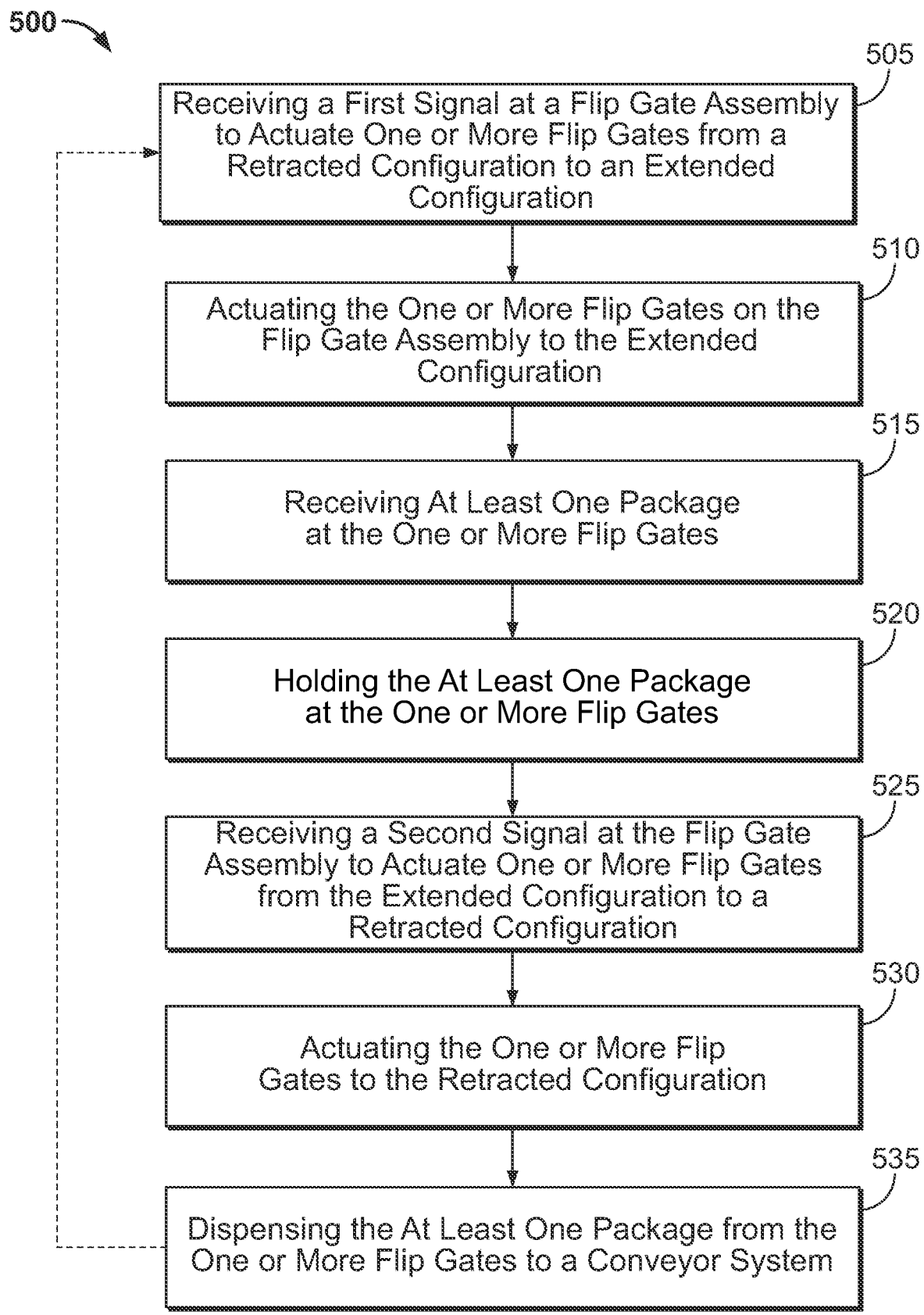
FIG. 11 illustrates a flowchart of an exemplary method for sorting and dispensing packages, in accordance with aspects of the present disclosure.

In this regard, and referring to FIG. 11, an example method 500 of sorting and dispensing packages is illustrated. In some embodiments, the method 500 can be implemented on a system for sorting and dispensing packages, such as the system 100 of FIGS. 1-10. In other embodiments, the method 500 can be implemented with other systems for sorting and dispensing packages that may include a flip gate assembly, such as the flip gate assembly 102 of FIGS. 1-10. Generally, the method 500 can be implemented in various settings or environments, such as a warehouse setting or material handling setting for sorting and dispensing high volumes of packages. In some cases, the method 500 of sorting and dispensing packages can be implemented in other settings where it is beneficial to sort and dispense packages using a time efficient and cost-effective method.

Referring still to FIG. 11, the method 500 may begin at step 505, which may include receiving a first signal at a flip gate assembly to actuate one or more flip gates, such as, e.g., receiving a first signal in the controller 170 of the flip gate assembly 102 of FIG. 5 to actuate the one or more flip gates 116. In some embodiments, one or more signals may be sent to the flip gate assembly from an operator, from a programmable logic controller (PLC), from a sensor, from a timer, or from any other electronic device to indicate when the flip gate assembly may actuate the one or more flip gates. Further, the one or more signals may be received at an actuator valve in fluid communication with the actuator, such as the valve 146 of the flip gate assembly 102, or alternatively, at a processor or controller in electrical, mechanical, or fluid communication with the actuator valve.

From step 505, the method may then include step 510, which can include actuating the one or more flip gates of the flip gate assembly to an extended configuration. For example, with reference to the flip gate assembly 102 of FIGS. 1-10, step 510 can include actuating the one or more flip gates 116 from the retracted configuration 124 to the extended configuration 122 by moving the actuators 110 from the retracted position to the extended position (see FIG. 7). From step 510, the method 500 may then include step 515, which can include receiving at least one package at the one or more flip gates, and, step 520, which can include, in response to receiving the at least one package, holding the at least one package at the one or more flip gates. For example, with reference again to the flip gate assembly 102 of FIGS. 1-10, steps 515, 520 can include receiving and holding at least one package 214 (see FIG. 2) at the one or more flip gates 116 being in the extended configuration 122. Generally, the method 500 can selectively actuate the one or more flip gates to the extended configuration in step 510 so that a plurality of packages of various shapes and sizes can be held in the flip gate assembly until a predetermined group of packages are sorted together during steps 515, 520. However, the step 510 of actuating the one or more flip gates to the extended configuration is preferably performed when there are no packages, and therefore no weight, resting on the flip gate. Accordingly, in some embodiments, a flip gate of a flip gate assembly can require a consistent amount of force to actuate from a retracted configuration to an extended configuration each time.

In some embodiments, during one or more of the steps 510, 515, 520, one or more flip gates may be actuated from the retracted configuration to the extended configuration, while one or more flip gates are not actuated from the retracted configuration to the extended configuration. Alternatively, also during one or more of the steps 510, 515, 520, one or more flip gates may be actuated from the extended configuration to the retracted configuration, while one or more flip gates are not actuated from the extended configuration to the retracted configuration. In some embodiments, the one or more flip gates can be actuated in unison or simultaneously, or the flip gates can be actuated individually or separately. Further, in some embodiments, two or more flip gates can be actuated in unison, while other flip gates are not actuated.

With continued reference to FIG. 11, from step 520, the method 500 may further include step 525, which can include receiving a second signal at the flip gate assembly to actuate the one or more flip gates from the extended configuration to the retracted configuration. For example, with reference again to the flip gate assembly 102 of FIGS. 1-10, the first and second signals can be received in the controller 170 (see FIG. 5) of the flip gate assembly 102 from one or more sensors (not shown) arranged along the flip gate assembly 102 or on other components of the system 100. In some embodiments, the first and second signals can correspond to first and second commands, respectively, from a controller that can be internal or external to the system. In some embodiments, the first and second signals can correspond to one or more sensed operating parameters.

In response to receiving the second signal in step 525, the method 500 may further include step 530, which can include actuating the one or more flip gates to the retracted configuration, and then step 535, which can include dispensing the at least one package from the one or more flip gates in the retracted configuration. For example, with reference again to the flip gate assembly 102 of FIGS. 1-10, the one or more flip gates 116 can be actuated from the extended configuration 122 to the retracted configuration 124 via movement of the actuators 110 (see FIG. 7) to dispense at least one package 214 (see FIG. 2) from the flip gate assembly 102. As indicated by the dashed arrow in FIG. 11, from the step 535 the method 500 can cycle back to the step 505 during continued operations. In some embodiments, the steps 505, 510 of method 500 can be automated such that the flip gates are configured to automatically move back to the extended configuration from the retracted configuration following the step 535. In such embodiments, the method 500 can cycle back to the step 515 from the step 535 during continued operations.

Generally, the steps 525, 530, 535 of the method 500 can operate the one or more flip gates to hold packages in the flip gate assembly until a predetermined number of packages are properly sorted and ready to be dispensed. In some embodiments, the method 500 may not include the steps 525, 530 and the flip gate assembly can be configured such that actuating the one or more flip gates to the retracted configured from the extended configuration is automatic based on a weight or force imposed on the flip gate by one or more packages. In some embodiments, the step 535 may further include dispensing the at least one package from the one or more flip gates to a conveyor system, such as the conveyor system 300 of FIGS. 1-3. In some embodiments, the method 500 can further include an additional step of dispensing the at least one package from the conveyor system to a bagging system, such as the bagging system 400 of FIGS. 1 and 2.

In regard to embodiments in which the method 500 is implemented on the flip gate assembly 102 of FIGS. 1-10, the particular arrangement and operations of the flip gates 116 is particularly advantageous in comparison to other known methods of sorting and dispensing packages. More specifically, in the flip gate assembly 102, as the flip gates 116 dispense packages by rotating to the retracted configuration 124, and thus the flip gate 116 can dispense packages of various sizes, shapes, and weights. On the other hand, known methods of sorting and dispensing packages are subject to variable forces as they commonly require packages to be pushed or lifted from one or more assemblies onto another assembly. However, in the illustrated embodiment, the flip gates 116 of the flip gate assembly 102 are assisted in moving from the extended configuration 122 to the retracted configuration 124 by the downward force of gravity. Accordingly, packages with various weights may further assist movement of the flip gates 116 to the retracted configuration 124, and thereby dispensing the packages, without requiring the flip gate assembly 102 to apply any additional force to dispense large packages having a significant weight as they freely slide along the inclined surface 104. As a result, in embodiments in which the method 500 is implemented on the flip gate assembly 102 of FIGS. 1-10, the flip gates 116 of the flip gate assembly 102 would require less energy while utilizing smaller and more efficient actuators 110, and therefore be more cost effective for sorting and dispensing packages when compared to known methods and systems to dispense packages.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device, e.g., a serial or parallel general purpose or specialized processor chip, a single- or multi-core chip, a microprocessor, a field programmable gate array, any variety of combinations of a control unit, arithmetic logic unit, and processor register, and so on, a computer, e.g., a processor device operatively coupled to a memory, or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media.

Some embodiments can include or utilize a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality, e.g., memory, communication systems, power sources, user interfaces and other inputs. In some embodiments, a control device can include a centralized hub controller that receives, processes, and transmits or retransmits control signals and other data to and from other distributed control devices, e.g., an engine controller, an implement controller, a drive controller, or the like, including as part of a hub-and-spoke architecture or otherwise.

The term "article of manufacture" as used herein is intended to encompass a computer program accessible from any computer-readable device, carrier, e.g., non-transitory signals, or media, e.g., non-transitory media. For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," "device," and the like are intended to encompass part or all of computer-related systems that include hardware, software, a combination of hardware and software, or software in execution. For example, a component may be, but is not limited to being, a processor device, a process being executed or executable by a processor device, an object, an executable, a thread of execution, a computer program, or a computer. By way of illustration, both an application running on a computer and the computer can be a component. One or more components or system, module, and so on may reside within a process or thread of execution, may be localized on one computer, may be distributed between two or more computers or other processor devices, or may be included within another component or system, module, and so on.

It will be appreciated by those skilled in the art that while the embodiments of the present disclosure have been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use and to teach the best mode of carrying out same. The exclusive rights to all modifications which come within the scope of the appended claims are reserved.

What is claimed is:

1. A system for sorting and dispensing packages, comprising:
    a flip gate assembly, including:
        a base frame including a front frame member, a rear frame member, and a support frame member disposed between the front and rear frame members;
        an inclined surface;
        a pair of sidewalls arranged on laterally opposed sides of the inclined surface;
        one or more support legs extending from the base frame to the inclined surface;
        an actuator pivotably attached to the support frame member of the base frame; and
        a flip gate pivotably attached to the inclined surface, the flip gate being configured to be moveable relative to the inclined surface and the pair of sidewalls by the actuator between a retracted configuration, in which a top side of the flip gate is planar with a top surface of the inclined surface, and an extended configuration, in which the top side of the flip gate is disposed at an angle with respect to the top surface of the inclined surface.

2. The system of claim 1, wherein the angle is in a range of between about 30 degrees and about 150 degrees.

3. The system of claim 1, wherein the flip gate assembly further includes
    a stability bar extending between the pair of sidewalls.

4. The system of claim 1, wherein the one or more support legs includes one or more front support legs and one or more rear support legs, and
    wherein the one or more front support legs extend vertically from the front frame member of the base frame to the inclined surface, and the one or more rear support legs extend vertically from the rear frame member of the base frame to the inclined surface.

5. The system of claim 4, wherein a gap is formed between the one or more front support legs, the one or more rear support legs, the base frame, and the inclined surface.

6. The system of claim 5, wherein the inclined surface is disposed at an angle in a range of between about 100 degrees and about 170 degrees with respect to a plane defined by the one or more rear support legs.

7. The system of claim 1, wherein the pair of sidewalls and the inclined surface at least partially form a chute that is configured to receive at least two or more packages.

8. The system of claim 1 further comprising:
    a tilt tray system configured to provide the packages that are received by the flip gate assembly; and
    a conveyor system configured to receive the packages that are dispensed from the flip gate assembly.

9. A system for sorting and dispensing packages, comprising:
    a flip gate assembly including:
        at least two inclined surfaces;
        at least two sidewalls extending vertically between the at least two inclined surfaces from an upper end to a lower end of the at least two inclined surfaces;
        at least two flip gates pivotably attached to the at least two inclined surfaces, respectively; and
        at least two actuators pivotably coupled to the at least two flip gates, respectively,
    wherein the at least two flip gates are configured to be actuated by the at least two actuators, respectively, between an extended configuration and a retracted configuration with respect to the at least two inclined surfaces, and
    wherein, with the at least two flip gates in the extended configuration, the at least two flip gates are disposed entirely between the upper and lower ends of the at least two inclined surfaces.

10. The system of claim 9, wherein the at least two inclined surfaces include a first inclined surface and a second inclined surface,
    wherein the at least two sidewalls includes a first sidewall, a second sidewall, and a third sidewall, the first and second sidewalls extending vertically from the first inclined surface with the second sidewall being arranged between the first inclined surface and the second inclined surface, the third sidewall extending vertically from the second inclined surface.

11. The system of claim 9, wherein a width of each of the at least two inclined surfaces is in a range of between about 15 inches and about 45 inches.

12. The system of claim 9, wherein a height of each of the at least two flip gates in the extended configuration is in a range of between about 10 inches and about 20 inches with respect to the at least two inclined surfaces, respectively.

13. The system of claim 9, wherein the at least two flip gates include a first flip gate and a second flip gate, and
    wherein the system is configured such that when the first flip gate is in the extended configuration, the second flip gate is in the extended configuration.

14. The system of claim 9, wherein the at least two flip gates include a first flip gate and a second flip gate, and
    wherein the system is configured such that when the first flip gate is in the extended configuration, the second flip gate is in the retracted configuration.

15. A method of sorting and dispensing packages, comprising:
    actuating one or more flip gates of a flip gate assembly to an extended configuration;
    receiving one or more first packages at the one or more flip gates;
    holding the one or more first packages at the one or more flip gates;
    receiving one or more second packages at the one or more flip gates that have a characteristic that is the same as that of the one or more first packages;

actuating the one or more flip gates to a retracted configuration; and dispensing the one or more first and second packages from the one or more flip gates.

16. The method of claim 15, wherein the step of actuating the one or more flip gates of the flip gate assembly to the extended configuration further comprises the step of not actuating at least one flip gate from the retracted configuration.

17. The method of claim 15, wherein the step of dispensing the one or more first and second packages from the one or more flip gates further comprises dispensing the one or more first and second packages from the one or more flip gates to a conveyor system.

18. The method of claim 15 further comprising:
receiving a first signal at the flip gate assembly, based on signals from one or more sensors of a system including the flip gate assembly, to actuate the one or more flip gates from the extended configuration to the retracted configuration.

19. The method of claim 18 further comprising:
receiving a second signal at the flip gate assembly, based on signals from the one or more sensors of the system, to actuate the one or more flip gates from the retracted configuration to the extended configuration.

20. The method of claim 15, wherein the one or more flip gates are pivotably actuated about respective one or more inclined surfaces of the flip gate assembly, and
wherein, with the one or more flip gates in the extended configuration, the one or more flip gates are disposed at an angle in a range of between about 30 degrees and about 120 degrees with respect to the one or more inclined surfaces, respectively.

* * * * *